United States Patent
Spyrou et al.

(10) Patent No.: US 10,626,236 B2
(45) Date of Patent: Apr. 21, 2020

(54) STORAGE-STABLE ONE-COMPONENT POLYURETHANE PREPREGS AND SHAPED BODIES COMPOSED OF POLYURETHANE COMPOSITION THAT HAVE BEEN PRODUCED THEREFROM

(71) Applicant: Evonik Degussa GmbH, Essen (DE)

(72) Inventors: Emmanouil Spyrou, Schermbeck (DE); Holger Loesch, Herne (DE); Andrea Diesveld, Gescher (DE); Susanne Kreischer, Herten (DE); Eike Langkabel, Wegberg (DE); Ralph Aldridge, Dülmen (DE); Elke Gollan, Herne (DE)

(73) Assignee: Evonik Operations GmbH, Essen (DE)

( * ) Notice: Subject to any disclaimer, the term of this patent is extended or adjusted under 35 U.S.C. 154(b) by 106 days.

(21) Appl. No.: 15/816,354

(22) Filed: Nov. 17, 2017

(65) Prior Publication Data

US 2018/0155515 A1    Jun. 7, 2018

(30) Foreign Application Priority Data

Dec. 2, 2016   (EP) ..................................... 16201842

(51) Int. Cl.
| | |
|---|---|
| *C08J 5/24* | (2006.01) |
| *C08G 18/79* | (2006.01) |
| *C08G 18/32* | (2006.01) |
| *C08G 18/24* | (2006.01) |
| *C08G 18/18* | (2006.01) |
| *C08G 18/16* | (2006.01) |
| *C08G 18/80* | (2006.01) |

(52) U.S. Cl.
CPC .............. *C08J 5/24* (2013.01); *C08G 18/165* (2013.01); *C08G 18/1875* (2013.01); *C08G 18/242* (2013.01); *C08G 18/246* (2013.01); *C08G 18/3206* (2013.01); *C08G 18/798* (2013.01); *C08G 18/8016* (2013.01); *C08G 18/8025* (2013.01); *C08J 2375/04* (2013.01); *C08J 2375/08* (2013.01)

(58) Field of Classification Search
CPC . C08J 5/24; C08G 18/79; C08G 18/32; C08G 18/24; C08G 18/16; C08G 18/18
USPC ......................................................... 524/590
See application file for complete search history.

(56) References Cited

U.S. PATENT DOCUMENTS

| | | | |
|---|---|---|---|
| 4,377,657 A | 3/1983 | Street et al. | |
| 4,476,054 A | 10/1984 | Disteldorf et al. | |
| 4,483,798 A | 11/1984 | Disteldorf et al. | |
| 4,495,229 A | 1/1985 | Wolf et al. | |
| 4,757,120 A | 7/1988 | Bristowe et al. | |
| 4,912,210 A | 3/1990 | Disteldorf et al. | |
| 4,929,724 A | 5/1990 | Engbert et al. | |
| 4,992,228 A | 2/1991 | Heck et al. | |
| 5,080,857 A | 1/1992 | Miller et al. | |
| 5,329,003 A | 7/1994 | Bruchmann | |
| 5,427,725 A | 6/1995 | White et al. | |
| 5,532,296 A | 7/1996 | Recker et al. | |
| 5,621,064 A | 4/1997 | Laas et al. | |
| 5,847,044 A | 12/1998 | Laas et al. | |
| 6,479,613 B2 | 11/2002 | Gras et al. | |
| 6,613,861 B2 | 9/2003 | Gras | |
| 6,761,953 B2 | 7/2004 | Haas et al. | |
| 6,908,980 B2 | 6/2005 | Gras | |
| 6,916,897 B2 | 7/2005 | Gras | |
| 8,455,090 B2 | 6/2013 | Schmidt et al. | |
| 8,896,258 B2 | 11/2014 | Abel et al. | |
| 2004/0231598 A1 | 11/2004 | Werner | |
| 2005/0215148 A1 | 9/2005 | Werner | |
| 2012/0003891 A1 | 1/2012 | Schmidt et al. | |
| 2013/0045652 A1 | 2/2013 | Schmidt et al. | |
| 2013/0078417 A1 | 3/2013 | Schmidt | |
| 2013/0230716 A1 | 9/2013 | Schmidt et al. | |
| 2013/0231017 A1* | 9/2013 | Schmidt ..................... | C08J 5/24 442/1 |
| 2013/0231022 A1 | 9/2013 | Schmidt et al. | |
| 2013/0303042 A1 | 11/2013 | Schmidt et al. | |
| 2014/0065911 A1 | 3/2014 | Schmidt et al. | |
| 2014/0087613 A1 | 3/2014 | Spyrou et al. | |

FOREIGN PATENT DOCUMENTS

| | | |
|---|---|---|
| DE | 3030572 A1 | 3/1982 |
| DE | 102009001806 A1 | 9/2010 |
| DE | 102009001793 A1 | 10/2010 |
| DE | 102010029355 A1 | 12/2011 |
| DE | 102010030233 A1 | 12/2011 |
| DE | 102010041239 A1 | 3/2012 |
| DE | 102010041243 A1 | 3/2012 |
| DE | 102010041247 A1 | 3/2012 |
| DE | 102010041256 A1 | 3/2012 |
| DE | 102011006163 A1 | 9/2012 |
| EP | 0297674 A2 | 1/1989 |

(Continued)

OTHER PUBLICATIONS

European Search Report dated Jun. 14, 2017 in EP 16 201 842.8 (3 pages).
Fuchsmann et al., U.S. Appl. No. 15/567,857, filed Oct. 19, 2017.
Langkabel et al., U.S. Appl. No. 15/602,723, filed May 23, 2017.
Langkabel et al., U.S. Appl. No. 15/603,966, filed May 24, 2017.
Langkabel et al., U.S. Appl. No. 15/604,118, filed May 24, 2017.
Stache et al., U.S. Appl. No. 15/622,159, filed Jun. 14, 2017.
Stache et al., U.S. Appl. No. 15/622,204, filed Jun. 14, 2017.

*Primary Examiner* — Deve V Hall

(74) *Attorney, Agent, or Firm* — Nexsen Pruet PLLC; Philip P. McCann

(57) ABSTRACT

The invention relates to storage-stable one-component (1K) polyurethane prepregs and to shaped bodies produced therefrom.

20 Claims, No Drawings

(56) References Cited

FOREIGN PATENT DOCUMENTS

| | | | |
|---|---|---|---|
| EP | 0309221 | A2 | 3/1989 |
| EP | 0417603 | A2 | 3/1991 |
| EP | 0590702 | A1 | 4/1994 |
| EP | 0639598 | A1 | 2/1995 |
| EP | 0669353 | A1 | 8/1995 |
| EP | 0669354 | A1 | 8/1995 |
| EP | 0803524 | A1 | 10/1997 |
| EP | 1319503 | A1 | 6/2003 |
| GB | 2007676 | | 5/1979 |
| GB | 2182074 | A | 5/1987 |
| JP | 2004196851 | A | 7/2004 |
| WO | 8904335 | A1 | 5/1989 |
| WO | 9831535 | A1 | 7/1998 |
| WO | 9850211 | A1 | 11/1998 |
| WO | 9964216 | A1 | 12/1999 |
| WO | 2003101719 | A2 | 12/2003 |
| WO | 2005049301 | A2 | 6/2005 |
| WO | 2005091715 | A1 | 10/2005 |
| WO | 2005106155 | A1 | 11/2005 |
| WO | 2006043019 | A1 | 4/2006 |

\* cited by examiner

STORAGE-STABLE ONE-COMPONENT POLYURETHANE PREPREGS AND SHAPED BODIES COMPOSED OF POLYURETHANE COMPOSITION THAT HAVE BEEN PRODUCED THEREFROM

This application claims the benefit of European Application No. 16201842.8 filed on Dec. 2, 2016 the disclosure of which is expressly incorporated herein by reference.

BACKGROUND

The invention relates to storage-stable one-component (1K) polyurethane prepregs and to shaped bodies produced therefrom.

1K polyurethane compositions are especially suitable for the production of storage-stable polyurethane prepregs and shaped bodies produced therefrom (composite components). The storage-stable polyurethane prepregs are obtainable by a process by means of impregnation in the form of weaves and scrims using these reactive polyurethane compositions.

Various molding processes, for example the reaction transfer molding (RTM) process, involve the introduction of the reinforcing fibers into a mold, the closing of the mold, the introduction of the crosslinkable resin formulation into the mold, and the subsequent crosslinking of the resin, typically by supplying heat.

One of the limitations of such a process is the relative difficulty in laying the reinforcing fibers into the mold. The individual layers of the weave or laid scrim have to be cut to size and matched to the different mold geometries. This can be both time-consuming and complicated, especially when the moldings are also to contain foam cores or other cores. Premoldable fiber reinforcement systems with easy handling and existing forming options would be desirable here.

Fiber-reinforced materials in the form of prepregs are already being used in many industrial applications because of their convenience of handling and the increased efficiency in processing compared to the alternative wet-layup methodology.

Industrial users of such systems, in addition to faster cycle times and higher storage stabilities—even at room temperature—are also demanding a way of cutting the prepregs to size, without contamination of the cutting tools with the often sticky matrix material in the course of automated cutting-to-size and laying-up of the individual prepreg layers.

As well as polyesters, vinyl esters and epoxy systems there are a number of specialized resins in the crosslinking matrix systems field. These also include polyurethane resins which, because of their toughness, damage tolerance and strength, are used particularly for production of composite profiles via pultrusion processes. A disadvantage often mentioned is that the isocyanates used are toxic.

Polyurethane composites also have superior toughness compared to vinyl esters, unsaturated polyester resins (UPE) or UPE-urethane hybrid resins.

Prepregs and composites produced therefrom that are based on epoxy systems are described, for example, in WO 98/50211, U.S. Pat. Nos. 4,992,228, 5,080,857, 5,427,725, GB 2007676, GB 2182074, EP 309 221, EP 297 674, WO 89/04335, U.S. Pat. Nos. 5,532,296 and 4,377,657, 4,757, 120.

WO 2006/043019 describes a process for producing prepregs based on epoxy resin-polyurethane powders.

Furthermore, prepregs based on thermoplastics in powder form as a matrix are known.

US 2004/0231598 describes a method in which the particles are guided through a specific acceleration chamber with electrostatic charging. This apparatus serves for coating of glass substrates, aramid substrates or carbon fiber substrates for the production of prepregs made from thermoplastic resins. Resins mentioned are polyethylene (PE), polypropylene (PP), polyether ether ketone (PEEK), polyether sulphone (PES), polyphenyl sulphone (PPS), polyimide (PI), polyamide (PA), polycarbonate (PC), polyethylene terephthalate (PET), polyurethane (PU), polyesters and fluoropolymers. The thermoplastic prepregs textiles produced therefrom exhibit inherent toughness, good viscoelastic damping characteristics, unlimited storage stability, good chemical resistance and recyclability.

WO 98/31535 describes a method of powder impregnation, in which the glass fiber or carbon fiber strands to be impregnated are contacted with a particle/liquid mixture or particle/gas mixture in a defined speed profile. The powders consist here of ceramic or thermoplastic materials, including thermoplastic polyurethane.

WO 99/64216 describes prepregs and composites and a method for the production thereof where emulsions comprising polymer particles having sufficiently small dimensions to allow envelopment of individual fibers are used. The polymers of the particles have a viscosity of at least 5000 centipoise and are either thermoplastics or crosslinking polyurethane polymers.

EP 0590702 describes powder impregnations for production of prepregs, in which the powder consists of a mixture of a thermoplastic and a reactive monomer or prepolymer. WO 2005/091715 likewise describes the use of thermoplastics for production of prepregs.

Michaeli et al. describes the development of a powder methodology for a pultrusion process with thermoplastic polyurethanes, called TPUs, in Coatings & Composite Materials, No. 19, p 37-39, 1997. In addition, the article Processing and properties of thermoplastic polyurethane prepreg (Ma, C. C. M.; Chiang, C. L. Annual Technical Conference—Society of Plastics Engineers (1991), 49th 2065-9.) discloses thermoplastic polyurethane (TPU) prepregs based on solvents and water-containing TPU systems.

Prepregs having a matrix based on two-component polyurethanes (2-K PUR) are known. The 2-K PUR category essentially comprises the conventional reactive polyurethane resin systems. In principle, this is a system consisting of two separate components. While the critical constituent of one component is always a polyisocyanate, the critical constituent in the second component comprises polyols or in more recent developments also amino- or amine-polyol mixtures. The two parts are mixed together only shortly before processing. Thereafter, the chemical curing takes place through polyaddition with formation of a network of polyurethane or polyurea. Two-component systems have a limited processing time (operating time, pot life) after the mixing of the two constituents, since the onset of reaction leads to gradual viscosity increase and finally to gelling of the system. Many variables determine its effective processibility period: reactivity of the co-reactants, catalysis, concentration, solubility, moisture content, NCO/OH ratio and ambient temperature are the most important [Lackharze (Coating Resins), Stoye/Freitag, Hauser-Verlag 1996, pages 210/212]. The disadvantage of the prepregs based on 2-K PUR systems of this type is that only a short period of time is available for the processing of the prepreg to give a composite. Therefore, such prepregs are not storage-stable over a number of hours, let alone days.

There follows a description of the polyurethane prepregs or composites based on 2-K PUR systems. The article by K. Recker reports on the development of a 2-K polyurethane system for the resin mat process, with particular attention to the processing properties for SMC components (Baypreg-ein neuer POLYURETHAN-Werkstoff für das Harzmatten-verfahren [A Novel Polyurethane Material for the Resin Mat Process], Recker, Klaus, Kunststoffe-Plastics 8, 1981).

WO 2005/049301 discloses a catalytically activated 2-K PUR system, wherein the polyisocyanate component and the polyol are mixed and processed by means of pultrusion to give a composite.

WO 2005/106155 discloses fiber-reinforced composites for the construction industry, which are produced by means of the long fiber injection (LFI) methodology with 2-K polyurethane systems.

JP 2004196851 describes composites which are produced from carbon fibers and organic fibers, for example hemp, using a matrix composed of 2-K PUR based on polymeric methylene diphenyl isocyanate (MDI) and specific compounds containing OH groups.

EP 1 319 503 describes polyurethane composites, wherein specific outer polyurethane layers are used for a fiber laminate which has been impregnated with a 2K PUR resin and encases a core layer (for example a paper honeycomb). The 2K PUR resin consists, for example, of MDI and a mixture of polypropylenetriols and diols of ethylene oxide-propylene oxide copolymers.

WO 2003/101719 describes polyurethane-based composites and the methods for production. These are 2-K polyurethane resins with defined viscosities and particular gel times.

2-K PUR systems are likewise discussed in: "Fiber reinforced polyurethane composites: shock tolerant components with particular emphasis on armor plating" (Ratcliffe, Colin P.; Crane, Roger M.; Santiago, Armando L., AMD (1995), 211 (Innovative Processing and Characterization of Composite Materials), 29-37.) and in Fiber-reinforced polyurethane composites. I. Process feasibility and morphology. (Ma, Chen Chi M.; Chen, Chin Hsing. International SAMPE Symposium and Exhibition (1992), 37 (Mater. Work. You 21st Century), 1062-74.)

Apart from the different binder basis, moisture-curing coating materials correspond to largely analogous 2K systems both in terms of composition and in terms of properties. In principle, the same solvents, pigments, fillers and auxiliaries are used. Unlike 2K coatings, for stability reasons, these systems do not tolerate any moisture at all before their application.

Also known are physically drying systems based on non-reactive PUR elastomers. These are linear thermoplastic urethanes of relatively high molecular weight, formed from diols and diisocyanates, preferably MDI, TDI, HDI and IPDI. Thermoplastic systems of this kind generally have very high viscosities and hence also very high processing temperatures. This is a crucial factor that makes them difficult to use for prepregs. In the production of prepregs with fiber composites, the use of powders in reactive systems is comparatively unusual and has to date been restricted to a few fields of use. Probably the most common method of transferring a powder to a fiber surface is the fluidized bed impregnation method. A flow directed upward puts powder particles in a state in which they have fluid-like properties. This method is employed in EP 590 702. In this case, the strands of individual fiber bundles are teased apart and coated with the powder in the fluidized bed. The powder consists here of a mixture of reactive and thermoplastic powder, in order thus to optimize the properties of the matrix. Individual rovings (fiber bundles) are finally laid together, and several plies are compressed at a pressure of 16 bar for about 20 minutes. The temperatures vary between 250 and 350° C. Frequently, however, there is irregular coating in the fluidized bed method, especially when strands are not pulled apart.

In this regard, US 20040231598 presents a method which works in a similar way to the fluidized bed method. In this case, an air stream transports the particles to the substrate and there is homogeneous deposition of the powder by virtue of a specific construction.

A further process is described by US 20050215148. In that case, with the apparatus just mentioned, homogeneous distributions of the powder on the fiber are achieved. The particle size ranges here from 1 to 2000 µm. Coating in a multitude of experiments is effected from one or two sides. The homogeneous application of the powder, after subsequent pressing of the prepregs, produces laminates without air inclusions.

A further application, WO 2006/043019, describes the use of epoxy- and amino-terminated resins in powder form. The powders here are mixed and applied to the fibers. Subsequently, the particles are attached by sintering. The particle size is between 1 and 3000 µm, but preferably between 1 and 150 µm.

This restriction in the particle size to comparatively small diameters is also recommended in a study from Michigan State University. The theory here is that particles having small diameters are more likely to be able to penetrate into cavities between individual filaments than particles having high diameters (S. Padaki, L.T. Drzal: a simulation study on the effects of particle size on the consolidation of polymer powder impregnated tapes, Department of Chemical Engineering, Michigan State University, Composites: Part A (1999), pp. 325-337).

As well as in prepreg methodology, reactive powder systems are also used in other conventional methods, for example in winding methodology [M. N. Ghasemi Nejhad, K. M. Ikeda: Design, manufacture and characterization of composites using on-line recycled thermoplastic powder impregnation of fibers and in-situ filament winding, Department of Mechanical Engineering, University of Hawaii at Manoa, Journal of Thermoplastic Composite Materials, Vol 11, pp. 533-572, November 1998] or in the pultrusion method. For the pultrusion method, for example, fiber ropes (towpregs) are coated with the powder and first wound and stored in the form of what are called towpregs. One means of production is described in an article in the SAMPE Journal [R. E. Allred, S. P. Wesson, D. A. Babow: powder impregnation studies for high temperature towpregs, Adherent Technologies, SAMPE Journal, Vol. 40, No. 6, pp. 40-48, November/December 2004]. In a further study, towpregs of this kind were pressed together and cured by the pultrusion process to give material components [N. C. Parasnis, K. Ramani, H. M. Borgaonkar: Ribbonizing of electrostatic powder spray impregnated thermoplastic tows by pultrusion, School of Mechanical Engineering, Purdue University, composites, Part A, Applied science and manufacturing, Vol. 27, pp. 567-574, 1996]. Even though the production of towpregs and subsequent compression in the pultrusion process has already been conducted with thermoset systems, only thermoplastic systems for the most part have been used to date in this process.

Storage-stable polyurethane prepregs and shaped bodies produced therefrom are known from DE 102009001793 and DE 102009001806. DE 102009001793 and DE 102009001806 describe a method for production of storage-stable prepregs, essentially composed of A) at least one fibrous carrier and B) at least one reactive pulverulent polyurethane composition as matrix material, which consist of at least one polyurethane component and at least one resin component. DE 102010029355 provides for the melt application of polyurethane prepreg systems; DE 102010030233 describes meandering polyurethane prepreg systems. DE 102010030234 details solvent-containing polyurethane prepreg systems. DE 102010041239 claims coloured polyurethane prepreg systems. DE 102010041256 in turn concerns polyurethane prepreg systems on fixed films, while DE 102010041243 describes polyurethane prepreg systems having a proportion by volume of fibers of less than 50%. DE102011006163 describes the use of a liquid resin component.

What is common to all these documents is that the matrix formulations described therein consist of a polyurethane component and a resin component.

SUMMARY

The problem addressed was that of finding a simpler process for producing polyurethane-based prepreg systems having problem-free handling that are based on polyurethane compositions. A further problem addressed by this invention was that of finding prepregs comprising polyurethane matrix material which can be produced by a simple process, with the main emphasis on the handling and the storability of the prepregs.

For the production of the prepregs, it would be advantageous if the viscosity of formulations of the uncrosslinked matrix materials were low enough to assure wetting of the fibrous carrier with a sufficient proportion by volume of fibers in the production of the composite component.

It has now been found that, surprisingly, these described applications in the field of the impregnated, reactive and storage-stable polyurethane prepregs can be implemented particularly advantageously when only one reactive polyurethane component without a resin component is used, where the Tg is <40° C. The processing-related advantage is revealed both in the production of the prepregs and in the subsequent pressing to give composite components within the scope of easier processability. In the subsequent pressing to give composites, the 1K polyurethane composition leads to an improved profile within the layers and hence to superior material properties.

Moreover, the lower viscosity of the matrix material at higher temperatures means that the pressing to give the composite component can be conducted at lower pressures, which makes production easier.

This affords prepregs having at least the same or even improved processing properties as described in DE102011006163, which are usable for the production of high-performance composites for a wide variety of different applications in the construction, automotive and aerospace sectors, in the energy industry (wind turbines) and in boat- and shipbuilding. The reactive polyurethane compositions usable in accordance with the invention are environmentally friendly and inexpensive, have good mechanical properties, are easy to process and feature good weathering resistance after curing and a balanced ratio of hardness to flexibility.

DETAILED DESCRIPTION

The invention provides prepregs
formed essentially from
A) at least one fibrous carrier
and
B) at least one polyurethane composition,
wherein the polyurethane composition having a Tg of less than 40° C. comprises essentially internally blocked and/or blocking agent-blocked di- and/or polyisocyanates and/or polyaddition compounds thereof.

The glass transition temperature Tg and the melting point are determined in accordance with DIN EN ISO 11357-1 and DIN 53765.

After being cooled down to room temperature, the prepregs of the invention have very high storage stability at room temperature. According to the reactive polyurethane composition and catalysis present, this storage stability is at least a few days at room temperature, but the prepregs are generally storage-stable for several weeks or even months at 40° C. or lower. The prepregs thus produced are usually not tacky and therefore have very good handling and further processibility. The reactive or highly reactive polyurethane compositions used in accordance with the invention accordingly have very good adhesion and distribution on the fibrous carrier. During the further processing of the prepregs to give composites (composite materials), for example by pressing at elevated temperatures, there is very good impregnation of the fibrous carrier, as a result of the fact that the reactive or highly reactive polyurethane compositions that are fluid and of low viscosity here give very good wetting of the fibers of the carrier prior to the crosslinking reaction, before the crosslinking reaction of the reactive or highly reactive polyurethane composition at elevated temperatures results in occurrence of gelation or through-hardening of the complete polyurethane matrix.

According to the composition of the reactive or highly reactive polyurethane composition used and of any catalysts added, it is possible to vary the rate of the crosslinking reaction in the production of the composite components and the properties of the matrix within wide ranges.

The matrix material is defined in the context of the invention as the reactive or highly reactive polyurethane composition used for production of the prepregs, and, in the context of description of the prepregs, as the still reactive or highly reactive polyurethane composition which has been applied to the fiber by the process according to the invention.

The matrix is defined as the matrix materials composed of the reactive or highly reactive polyurethane compositions that are crosslinked in the composite.

Carrier

The fibrous carrier in the present invention consists of fibrous material (also often called reinforcing fibers). Any material that the fibers consist of is generally suitable, but preference is given to using fibrous material made of glass, carbon, plastics such as polyamide (aramid) or polyester, natural fibers, or mineral fiber materials such as basalt fibers or ceramic fibers (oxidic fibers based on aluminium oxides and/or silicon oxides). It is also possible to use mixtures of fiber types, for example weave combinations of aramid and glass fibers, or carbon and glass fibers. Hybrid composite components are similarly obtainable by using prepregs comprising different fibrous carriers.

Mainly because of their relatively low cost, glass fibers are the most commonly used fiber types. In principle, all types of glass-based reinforcing fibers are suitable here (E glass, S glass, R glass, M glass, C glass, ECR glass, D glass, AR glass, or hollow glass fibers). In general, carbon fibers are used in high performance composite materials, where the lower density in comparison to glass fiber with at the same time high strength is also an important factor. Carbon fibers are industrially produced fibers composed of carbonaceous starting materials which are converted by pyrolysis to carbon in a graphite-like arrangement. A distinction is made between isotropic and anisotropic types: isotropic fibers have only low strengths and lower industrial significance; anisotropic fibers exhibit high strengths and rigidities with simultaneously low elongation at break. Natural fibers refer here to all textile fibers and fibrous materials which are obtained from plant and animal material (for example wood fibers, cellulose fibers, cotton fibers, hemp fibers, jute fibers, flax fibers, sisal fibers and bamboo fibers). Similarly to carbon fibers, aramid fibers exhibit a negative coefficient of thermal expansion, i.e. become shorter on heating. Their specific strength and their modulus of elasticity are markedly lower than those of carbon fibers. In combination with the positive coefficient of expansion of the matrix resin, it is possible to produce components of high dimensional stability. Compared to carbon fiber-reinforced plastics, the compressive strength of aramid fiber composite materials is much lower. Known brand names for aramid fibers are Nomex® and Kevlar® from DuPont, or Teijinconex®, Twaron® and Technora® from Teijin. Particularly suitable and preferred carriers are those made of glass fibers, carbon fibers, aramid fibers or ceramic fibers. The fibrous material is a sheetlike textile structure. Suitable materials are sheetlike textile structures made from nonwoven fabric, and likewise knitted fabric including loop-formed and loop-drawn knits, but also non-knitted fabrics such as weaves, laid scrims or braids. In addition, a distinction is made between long-fiber and short-fiber materials as carriers. Likewise suitable in accordance with the invention are rovings and yarns. In the context of the invention, all the materials mentioned are suitable as fibrous carriers. An overview of reinforcing fibers is contained in "Composites Technologien", Paolo Ermanni (Version 4), script for lecture at ETH Zürich, August 2007, Chapter 7.

Matrix Material

Suitable matrix materials are in principle also all other reactive polyurethane compositions that are storage-stable at room temperature. According to the invention, suitable polyurethane compositions contain temporarily deactivated, i.e. internally blocked di- or polyisocyanates and/or those that have been blocked with blocking agents.

The di- and polyisocyanates used in accordance with the invention may consist of any desired aromatic, aliphatic, cycloaliphatic and/or (cyclo)aliphatic di- and/or polyisocyanates.

Suitable aromatic di- or polyisocyanates are in principle any known aromatic compounds. Particularly suitable compounds are phenylene 1,3- and 1,4-diisocyanate, naphthylene 1,5-diisocyanate, toluidine diisocyanate, tolylene 2,6-diisocyanate, tolylene 2,4-diisocyanate (2,4-TDI), diphenylmethane 2,4'-diisocyanate (2,4'-MDI), diphenylmethane 4,4'-diisocyanate, mixtures of monomeric diphenylmethane diisocyanates (MDI) and oligomeric diphenylmethane diisocyanates (polymer MDI), xylylene diisocyanate, tetramethylxylylene diisocyanate and triisocyanatotoluene.

Suitable aliphatic di- or polyisocyanates advantageously have 3 to 16 carbon atoms, preferably 4 to 12 carbon atoms, in the linear or branched alkylene moiety and suitable cycloaliphatic or (cyclo)aliphatic diisocyanates advantageously have 4 to 18 carbon atoms, preferably 6 to 15 carbon atoms, in the cycloalkylene moiety.

(Cyclo)aliphatic diisocyanates are well understood by the skilled person as meaning simultaneously cyclically and aliphatically bonded NCO groups, as is the case with isophorone diisocyanate for example. By contrast, cycloaliphatic diisocyanates are diisocyanates where only NCO groups are directly attached to the cycloaliphatic ring, e.g. $H_{12}MDI$.

Suitable aliphatic di- or polyisocyanates are cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate, dodecane di- and triisocyanates. Likewise suitable are 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, 1,4-diisocyanato-4-methylpentane.

It will be appreciated that it is also possible to use mixtures of the di- and polyisocyanates.

In addition, preference is given to using oligo- or polyisocyanates which can be prepared from the stated di- or polyisocyanates or mixtures thereof by linking by means of urethane, allophanate, urea, biuret, uretdione, amide, isocyanurate, carbodiimide, uretonimine, oxadiazinetrione or iminooxadiazinedione structures. Isocyanurates are particularly suitable, especially of IPDI and/or HDI.

The polyisocyanates used in accordance with the invention are blocked.

In this case, the composition is the reactive polyurethane composition according to the invention.

Useful blocking agents are external blocking agents, for example ethyl acetoacetate, diisopropylamine, methyl ethyl ketoxime, diethyl malonate, ε-caprolactam, 1,2,4-triazole, phenol or substituted phenols and 3,5-dimethylpyrazole.

The polyisocyanates used with preference are IPDI adducts containing isocyanurate moieties and ε-caprolactam-blocked isocyanate structures.

Internal blocking is also possible, and this is used with preference. The internal blocking is effected via dimer formation via uretdione structures which, at elevated temperature, are dissociated back to the isocyanate structures originally present and hence set in motion the crosslinking with the binder.

It is optionally possible for the reactive polyurethane compositions to contain additional catalysts. These catalysts are organometallic catalysts, for example dibutyltin dilaurate (DBTL), tin octoate, bismuth neodecanoate, or else tertiary amines, for example 1,4-diazabicyclo[2.2.2]octane, in amounts of 0.001%-1% by weight. These reactive polyurethane compositions used in accordance with the invention are cured under standard conditions, for example with DBTL catalysis, at or above 160° C., typically at or above about 180° C.

For the preparation of the reactive polyurethane compositions, it is possible to add the additives that are customary in powder coating technology, such as levelling agents, for example polysilicones or acrylates, light stabilizers, for example sterically hindered amines, or other auxiliaries, as described in EP 669 353, for example, in a total amount of 0.05% to 5% by weight. Fillers and pigments, for example titanium dioxide or dyes, may be added in an amount of up to 50% by weight of the overall composition.

"Reactive" (variant I) in the context of this invention means that the reactive polyurethane compositions used in accordance with the invention, as described above, cure at temperatures over and above 160° C., depending on the nature of the carrier.

The reactive polyurethane compositions used in accordance with the invention are cured under standard conditions, for example with DBTL catalysis, at or above 160° C., typically at or above about 180° C. The time taken to cure the polyurethane composition used in accordance with the invention is generally within 5 to 60 minutes.

Preferably, in the present invention, a polyurethane composition B) with Tg<40° C. is used, comprising a highly reactive polyaddition compound a) containing uretdione groups.

Preferably, in the present invention, a polyurethane composition B) with Tg<40° C. is used, essentially comprising
a) at least one polyaddition compound containing uretdione groups, based on the polyaddition reaction of polyisocyanates containing aliphatic, (cyclo)aliphatic or cycloaliphatic uretdione groups and hydroxyl-containing compounds, where the polyaddition compound has a free NCO content of less than 5% by weight and a uretdione content of 3%-25% by weight,
b) optionally at least one catalyst,
c) optionally auxiliaries and additives known from polyurethane chemistry.

Polyisocyanates containing uretdione groups are well-known and are described, for example, in U.S. Pat. Nos. 4,476,054, 4,912,210, 4,929,724 and EP 417 603. A comprehensive overview of industrially relevant methods for dimerization of isocyanates to uretdiones is given by J. Prakt. Chem. 336 (1994) 185-200. The conversion of isocyanates into uretdiones is generally carried out in the presence of soluble dimerization catalysts, such as, for example, dialkylaminopyridines, trialkylphosphines, phosphoramides or imidazoles. The reaction, optionally conducted in solvents, but preferably in the absence of solvents, is stopped—by addition of catalyst poisons—on attainment of a desired conversion. Excess monomeric isocyanate is subsequently removed by short-path evaporation. If the catalyst is sufficiently volatile the reaction mixture can be freed of the catalyst in the course of the monomer removal. Addition of catalyst poisons may be eschewed in this case. A wide range of isocyanates is suitable in principle for producing polyisocyanates comprising uretdione groups. It is possible to use the abovementioned di- and polyisocyanates. Preference is given, however, to di- and polyisocyanates from any desired aliphatic, cycloaliphatic and/or (cyclo)aliphatic di- and/or polyisocyanates.

Preference is given to using isophorone diisocyanate hexamethylene diisocyanate (HDI), 4,4'-diisocyanatodicyclohexylmethane, 2,4'-diisocyanatodicyclohexylmethane, 2,2'-diisocyanatodicyclohexylmethane, alone or in mixtures of the isomers ($H_{12}$MDI), 2-methylpentane diisocyanate (MPDI), 2,2,4-trimethylhexamethylene diisocyanate, 2,4,4-trimethylhexamethylene diisocyanate and mixtures thereof (TMDI), norbornane diisocyanate (NBDI), alone or in mixtures, for preparation of the uretdiones.

Very particular preference is given to using IPDI, HDI, TMDI and $H_{12}$MDI, alone or in mixtures. In a particularly preferred embodiment, IPDI and/or 4,4'-H12MDI and/or HDI and/or a mixture of 2,2,4-TMDI and 2,4,4-TMDI is used.

Very particular preference is given to using the uretdione of IPDI and/or HDI.

It is also possible to use mixtures of any desired uretdiones.

The reaction of these polyisocyanates containing uretdione groups to give polyurethane compositions containing uretdione groups comprises the reaction of the free NCO groups with hydroxyl-containing monomers or polymers, for example polyesters, polythioethers, polyethers, polycaprolactams, polyepoxides, polyesteramides, polyurethanes or low molecular weight di-, tri- and/or tetraalcohols as chain extenders, and optionally monoamines and/or monoalcohols as chain terminators, and has already been described frequently (EP 669 353, EP 669 354, DE 30 30 572, EP 639 598 or EP 803 524).

Preferred polyaddition compounds having uretdione groups have a free NCO content of less than 5% by weight and a content of uretdione groups of 3% to 25% by weight, preferably 6% to 18% by weight (calculated as $C_2N_2O_2$, molecular weight 84). Preference is given to polyesters and monomeric di- or polyalcohols. Apart from the uretdione groups, the polyurethane composition may also have isocyanurate, biuret, allophanate, urethane and/or urea structures.

Preferably, in the reaction for formation of the uretdione-containing polyaddition compound, the ratio of the sum total of latent and free NCO groups and the co-reactants that are reactive toward isocyanates (e.g. polyols) is chosen such that NCO (free+latent)/OH=1.8:1 to 1:1.8, more preferably 1.2:1 to 1:1.2.

In this step, it is only the free NCO groups that are converted, and not the latent NCO groups. For this purpose, the reaction temperature must not exceed 120° C.; preferably, a temperature of 80° C. must not be exceeded.

The uretdione-containing polyaddition compound a) can be prepared in suitable apparatus, for example heatable stirred tanks, kneaders, or else extruders. It is also possible here to use standard PUR catalysts (see below) as under b) and/or else aprotic solvents. Examples of these include: ketones (acetone, methyl ethyl ketone, methyl isobutyl ketone, cyclohexanone), ethers (tetrahydrofuran), esters (n-propyl acetate, n-butyl acetate, isobutyl acetate, 1,2-propylene carbonate, propylene glycol methyl ether acetate).

It is optionally possible for additional catalysts b) to be present in the reactive polyurethane compositions B) according to the invention. These catalysts are organometallic catalysts, for example dibutyltin dilaurate, zinc octoate, bismuth neodecanoate, or else tertiary amines, for example 1,4-diazabicyclo[2.2.2]octane, in amounts of 0.001%-1% by weight. After impregnation of the fibers, these reactive polyurethane compositions used in accordance with the invention are normally cured, for example with DBTL catalysis, at or above 160° C., typically at or above about 180° C., and are referred to as variant I.

For the preparation of the reactive polyurethane compositions according to the invention, it is possible to add the additives c) that are customary in paint, adhesive and sealant technology, such as levelling agents, for example polysilicones or acrylates, light stabilizers, for example sterically hindered amines, or other auxiliaries, as described in EP 669 353, for example, in a total amount of 0.05% to 5% by weight. Fillers and pigments such as titanium dioxide, for example, may be added in an amount of up to 30% by weight of the overall composition.

The reactive 1K polyurethane compositions used in accordance with the invention give very good levelling, and hence good impregnatability on fibers and, in the cured state, excellent chemical resistance. When aliphatic crosslinkers (e.g. IPDI or H12MDI) are used, good weathering resistance is additionally achieved.

Particular preference is given to using, in the invention, a 1K polyurethane composition B) composed of
B) at least one polyurethane composition containing uretdione groups and having Tg<40° C., essentially comprising
a) at least one polyaddition compound containing uretdione groups and
b) optionally at least one PUR catalyst,
c) optionally auxiliaries and additives known from polyurethane chemistry,
d) 0.1% to 5% by weight of at least one catalyst selected from quaternary ammonium salts and/or quaternary phosphonium salts with halogens, hydroxides, alkoxides or organic or inorganic acid anions as counterion,
and
e) 0.1% to 5% by weight of at least one cocatalyst selected from
e1) at least one epoxide and/or
e2) at least one metal acetylacetonate and/or quaternary ammonium acetylacetonate and/or quaternary phosphonium acetylacetonate.

Very particular preference is given to using a 1K polyurethane composition B) composed of
B) at least one polyurethane composition containing uretdione groups and having Tg<40° C., essentially comprising
a) at least one polyaddition compound containing uretdione groups, based on polyaddition compounds of polyisocyanates containing aliphatic, (cyclo)aliphatic or cycloaliphatic uretdione groups and hydroxyl-containing compounds, where the polyaddition compound has a free NCO content of less than 5% by weight and a uretdione content of 3%-25% by weight,
and
b) optionally at least one PUR catalyst,
c) optionally auxiliaries and additives known from polyurethane chemistry,
d) 0.1% to 5% by weight of at least one catalyst selected from quaternary ammonium salts and/or quaternary phosphonium salts with halogens, hydroxides, alkoxides or organic or inorganic acid anions as counterion,
and
e) 0.1% to 5% by weight of at least one cocatalyst selected from
e1) at least one epoxide
and/or
e2) at least one metal acetylacetonate and/or quaternary ammonium acetylacetonate and/or quaternary phosphonium acetylacetonate.

These highly reactive polyurethane compositions used in accordance with the invention are cured at temperatures of preferably 100 to 160° C. and are referred to as variant II.

The specific catalysts under d) and e) assure curing of the polyurethane compositions containing uretdione groups at low temperatures. The polyurethane compositions containing uretdione groups are thus highly reactive.

Polyaddition compounds a) containing uretdione groups that are used are those as described above.

Components b and c) are used as described above.

Catalysts used under d) are quaternary ammonium salts, preferably tetraalkylammonium salts and/or quaternary phosphonium salts, with halogens, hydroxides, alkoxides or organic or inorganic acid anions as counterion. Examples of these are:

tetramethyl ammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate, and tetrabutylphosphonium acetate, tetrabutylphosphonium formate and ethyltriphenylphosphonium acetate, tetrabutylphosphonium benzotriazolate, tetraphenylphosphonium phenolate and trihexyltetradecylphosphonium decanoate, methyltributylammonium hydroxide, methyltriethylammonium hydroxide, tetramethyl ammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, methyltributylammonium methoxide, methyltriethylammonium methoxide, tetramethylammonium methoxide, tetraethylammonium methoxide, tetrapropylammonium methoxide, tetrabutylammonium methoxide, tetrapentylammonium methoxide, tetrahexylammonium methoxide, tetraoctylammonium methoxide, tetradecylammonium methoxide, tetradecyltrihexylammonium methoxide, tetraoctadecylammonium methoxide, benzyltrimethylammonium methoxide, benzyltriethylammonium methoxide, trimethylphenylammonium methoxide, triethylmethylammonium methoxide, trimethylvinylammonium methoxide, methyltributylammonium ethoxide, methyltriethylammonium ethoxide, tetramethylammonium ethoxide, tetraethylammonium ethoxide, tetrapropylammonium ethoxide, tetrabutyl ammonium ethoxide, tetrapentylammonium ethoxide, tetrahexylammonium ethoxide, tetraoctylammonium methoxide, tetradecylammonium ethoxide, tetradecyltrihexylammonium ethoxide, tetraoctadecylammonium ethoxide, benzyltrimethylammonium ethoxide, benzyltriethylammonium ethoxide, trimethylphenylammonium ethoxide, triethylmethylammonium ethoxide, trimethylvinylammonium ethoxide, methyltributylammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctylammonium benzylate, tetradecylammonium benzylate, tetradecyltrihexyl ammonium benzylate, tetraoctadecylammonium benzylate, benzyltrimethylammonium benzylate, benzyltriethylammonium benzylate, trimethylphenylammonium benzylate, triethylmethylammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutyl ammonium bromide, tetrabutylammonium iodide, tetraethylammonium chloride, tetraethylammonium bromide, tetraethylammonium iodide, tetramethyl ammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributyl ammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexyl ammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride. These catalysts may be added alone or in any desired mixtures.

Preference is given to using tetraethylammonium benzoate and/or tetrabutylammonium hydroxide.

The proportion of catalysts d) may be 0.1% to 5% by weight, preferably from 0.3% to 2% by weight, based on the overall formulation of the polyurethane composition.

One variant of the invention includes the attachment of such catalysts d) to the functional groups of the polyaddition compounds a). Furthermore, these catalysts may be surrounded by an inert shell and hence encapsulated.

Cocatalysts e1) used are epoxides. Useful examples include glycidyl ethers, glycidyl esters, aliphatic epoxides, diglycidyl ethers based on bisphenol A and/or glycidyl methacrylates. Examples of such epoxides are triglycidyl isocyanurate (TGIC, trade name: Araldit 810, Huntsman), mixtures of diglycidyl terephthalate and triglycidyl trimellitate (trade name: Araldit PT 910 and 912, Huntsman), glycidyl esters of Versatic acid (trade name: Kardura E10, Shell), 3,4-epoxycyclohexylmethyl 3',4'-epoxycyclohexanecarboxylate (ECC), diglycidyl ethers based on bisphenol A (trade name: EPIKOTE 828, Shell), ethylhexyl glycidyl ether, butyl glycidyl ether, pentaerythrityl tetraglycidyl ether (trade name: Polypox R 16, UPPC AG), and other Polypox products having free epoxy groups. It is also possible to use mixtures. Preference is given to using mixtures of diglycidyl terephthalate and triglycidyl trimellitate (ARALDIT PT 910 and/or 912).

Useful cocatalysts e2) include metal acetylacetonates. Examples thereof are zinc acetylacetonate, lithium acetylacetonate and tin acetylacetonate, alone or in mixtures. Preference is given to using zinc acetylacetonate.

Useful cocatalysts e2) are also quaternary ammonium acetylacetonates or quaternary phosphonium acetylacetonates.

Examples of such catalysts are tetramethylammonium acetylacetonate, tetraethylammonium acetylacetonate, tetrapropylammonium acetylacetonate, tetrabutylammonium acetylacetonate, benzyltrimethylammonium acetylacetonate, benzyltriethylammonium acetylacetonate, tetramethylphosphonium acetylacetonate, tetraethylphosphonium acetylacetonate, tetrapropylphosphonium acetylacetonate, tetrabutylphosphonium acetylacetonate, benzyltrimethylphosphonium acetyl acetonate, benzyltriethylphosphonium acetylacetonate. Particular preference is given to using tetraethylammonium acetylacetonate and/or tetrabutylammonium acetylacetonate. It will be appreciated that mixtures of such catalysts may also be used.

The proportion of cocatalysts e1) and/or e2) may be 0.1% to 5% by weight, preferably from 0.3% to 2% by weight, based on the overall formulation of the matrix material.

"Highly reactive" (variant II) in the context of this invention means that the polyurethane compositions B) containing uretdione groups that are used in accordance with the invention cure at temperatures of 100 to 220° C., depending on the nature of the carrier. This curing temperature is preferably 120 to 180° C., more preferably from 130 to 140° C. The time taken to cure the polyurethane composition used in accordance with the invention is generally within 1 to 60 minutes. With the aid of the highly reactive 1K polyurethane compositions B) used in accordance with the invention, which thus cure at low temperature, it is possible at a curing temperature of 100 to 160° C. not just to save energy and curing time, but it is also possible to use many thermally sensitive carriers.

The reactive or highly reactive polyurethane compositions used in accordance with the invention give very good levelling, and hence good impregnatability and, in the cured state, excellent chemical resistance. When aliphatic crosslinkers (e.g. IPDI or $H_{12}MDI$) are used, good weathering resistance is additionally achieved.

The prepregs produced in accordance with the invention, and also the composite components, have a proportion by volume of fibers of greater than 10%, preferably of 50%-70%, more preferably of 50% to 65%.

The polyurethane compositions B) may be liquid, of high viscosity, or solid. In general, the 1K polyurethane composition has a Tg or melting point of at least 30° C., but not more than 39° C.

The reactive or highly reactive polyurethane compositions used in accordance with the invention generally do not react until above 160° C. in the case of the reactive polyurethane compositions, or above 100° C. in the case of the highly reactive polyurethane compositions, to give a crosslinked polyurethane and hence form the matrix of the composites. This means that the prepregs according to the invention, after they have been produced, are formed from the carrier and the applied reactive polyurethane composition which is in uncrosslinked but reactive form.

The prepregs are thus storage-stable, generally for several days or even weeks and months, and can thus be processed further to give composites at any time. This is the essential difference from the 2-component systems that have already been described above, which are reactive and not storage-stable, since they begin to react and crosslink to give polyurethanes immediately after application.

The invention also provides a process for producing prepregs formed essentially from
A) at least one fibrous carrier
and
B) at least one polyurethane composition with Tg<40° C.,
I. by preparing the polyurethane composition B),
and II. impregnating the fibrous carrier A) with the polyurethane composition B) which has optionally been dissolved in solvent, III. and optionally removing the solvent.

The principle of the process for producing prepregs is that a reactive polyurethane composition B) is first produced from its individual components, optionally in a suitable common solvent. This combination of the reactive polyurethane composition B) and optionally solvents is then applied to the fibrous carrier A), preferably directly after the production of the reactive polyurethane composition B), by soaking/impregnating the fibrous carrier. Subsequently, the optional solvent is optionally removed. Preferably, the solvent is removed completely at low temperature, preferably <160° C., more preferably <100° C., for example by thermal treatment or vacuum application.

Thereafter, the storable prepregs can be processed further to give composites at a later juncture. The process according to the invention results in very good impregnation of the fibrous carrier.

The production of the polyurethane composition B) for production of the prepregs can be effected in suitable apparatus, for example heatable stirred tanks, kneaders, or else extruders, where upper temperature limits of 100° C. should not be exceeded.

Suitable solvents used for the process according to the invention may be all aprotic liquids that are not reactive toward the reactive polyurethane compositions, have sufficient dissolution capacity with respect to the individual components of the reactive polyurethane composition used, and can be removed down to minor traces (<1% by weight) from the prepreg impregnated with the reactive polyurethane composition in the course of the process step of solvent removal, it being advantageous to recycle the solvent removed.

Examples of these include: ketones (acetone, methyl ethyl ketone, methyl isobutyl ketone, cyclohexanone), ethers (tetrahydrofuran), esters (n-propyl acetate, n-butyl acetate, isobutyl acetate, 1,2-propylene carbonate, propylene glycol methyl ether acetate).

It is possible in principle, in accordance with the invention, to produce the prepregs by this impregnation process, optionally with solvents, by any desired methods by means of the known plants and apparatuses.

Solution impregnation is used inter alia for the production of epoxy composites ["Composites Technologien, Paolo Ermanni (Version 4), script for lecture at ETH Zürich, August 2007, Chapter 4.2.2"]. However, no reactive polyurethane compositions in solution are mentioned therein.

Alternatively, the fibers can also be impregnated without solvent in the direct melt method.

The invention provides a direct melt impregnation process for production of prepregs formed essentially from A) at least one fibrous carrier
and
B) at least one polyurethane composition with Tg<40° C. as matrix material, I. by preparing the polyurethane composition B) in the melt, and II. directly impregnating the fibrous carrier A) with the melt from B).

The principle of the direct melt impregnation process for the prepregs is that a reactive polyurethane composition B) is first produced from its individual components. This melt of the reactive polyurethane composition B) is then applied directly to the fibrous carrier A), meaning that the fibrous carrier A) is impregnated with the melt composed of B).

Thereafter, the cooled storable prepregs can be processed further to give composites at a later juncture. By virtue of the direct melt impregnation processes according to the invention, there is very good impregnation of the fibrous carrier, as a result of the fact that the reactive polyurethane compositions that are fluid and of low viscosity here give very good wetting of the fibers of the carrier, with avoidance, through prior melt homogenization, of the thermal stress on the polyurethane composition that can lead to commencement of the crosslinking reaction; in addition, the process steps of grinding and sieving into individual particle size fractions are dispensed with, and so a higher yield of impregnated fibrous carrier is achieved.

The prepregs can, if required, be combined and cut to size to give different shapes.

For consolidation of the prepregs to give a single composite and for crosslinking of the matrix material to give the matrix, the prepregs are cut to size, optionally sewn or fixed in some other way, and compressed in a suitable shape under pressure and optionally with application of vacuum. In the context of this invention, this operation of production of the composites from the prepregs, according to the curing time, is effected at temperatures above about 160° C. with use of reactive matrix materials (variant I), or in the case of high-reactivity matrix materials provided with appropriate catalysts (variant II) at temperatures above 100° C.

The invention also provides for the use of the prepregs, especially having fibrous carriers composed of glass fibers, carbon fibers or aramid fibers.

The invention also provides for the use of the prepregs according to the invention for the production of composites in boat- and shipbuilding, in aerospace technology, in automobile construction, for two-wheeled vehicles, preferably motorcycles and pedal cycles, in the automotive, transportation, construction, medical technology and sports sectors, the electrical and electronics industry, and in energy generation installations, for example for rotor blades in wind turbines.

The invention also provides the prepregs produced by the process according to the invention.

The invention also provides the composite components produced from the prepregs according to the invention.

The invention is elucidated hereinafter by examples.

EXAMPLES

The following glass fiber scrims/fabrics were used in the examples:

Glass filament weave 296 g/m² — Atlas, Finish FK 144 (Interglas 92626)

A) Production of the Conventional Curing Agent and the Reactive Polyurethane Composition (Two-Stage, Noninventive):

119.1 g of IPDI uretdione (Evonik Industries, NCO number (total: free+latent)=37.8) were dissolved in 100 ml of butyl acetate, and 27.5 g of methylpentanediol and 3.5 g of trimethylolpropane were added. After adding 0.01 g of dibutyltin dilaurate, the mixture was heated to 80° C. while stirring for 4 h (NCO total/OH=1.96:1). Thereafter, no free NCO groups were detectable any longer by titrimetric methods. The curing agent has an effective latent NCO content of 12.8% by weight (based on solids). Added to this curing agent in the second stage are 42 g of a resin component (Polyol 4640, OH number: 630, Perstorp). After removal of the solvent on a rotary evaporator, a TG of this mixture of 45° C. is determined.

B) Production of the Highly Reactive Composition (One-Stage, Inventive):

119.1 g of IPDI uretdione (Evonik Industries) were dissolved in 100 ml of butyl acetate, and 27.5 g of methylpentanediol, 3.5 g of trimethylolpropane and 42 g of Polyol 4640 (Perstorp, OH number 630 mg KOH/g) were added. After adding 0.01 g of dibutyltin dilaurate, the mixture was heated to 80° C. while stirring for 4 h (NCO total/OH=1.05:1). Thereafter, no free NCO groups were detectable any longer by titrimetric methods. This composition has an effective latent NCO content of 11.0% by weight (based on solids). After removal of the solvent on a rotary evaporator, a TG of this mixture of 38° C. is determined.

Polyurethane compositions having the formulations which follow were used for production of the prepregs and the composites.

TABLE 1

|  | Example 1 * | Example 2 | Example 3 * | Example 4 |
|---|---|---|---|---|
| Two-stage mixing (A) | 76.0% by weight |  | 68.6% by weight |  |
| One-stage mixing (B) |  | 76.0% by weight |  | 68.6% by weight |
| Butyl acetate (solvent) | 23.8% by weight | 23.8% by weight | 29.0% by weight | 29.0% by weight |
| Benzoin (degassing agent, Aldrich) | 0.2% by weight | 0.2% by weight | 0.2% by weight | 0.2% by weight |
| Tetraethylammonium benzoate (catalyst, Evonik Industries) |  |  | 0.5% by weight | 0.5% by weight |
| Araldit PT 912 (epoxide, Huntsman) |  |  | 1.5% by weight | 1.5% by weight |
| Oxalic acid (acid, Aldrich) |  |  | 0.2% by weight | 0.2% by weight |
| Total | 100% by weight | 100% by weight | 100% by weight | 100% by weight |
| Melt viscosity after removal of the solvent at 140° C. | 17 Pas | 12 Pas | 12 Pas | 7 Pas |

* Noninventive comparative tests according to DE102011006163

What is clearly apparent is the lower melt viscosity of the inventive composition and hence simpler and quicker impregnation of the fibers.

The feedstocks from the table were intimately mixed in a premixer and then dissolved in the solvent specified.

To produce the prepregs, the glass fiber fabric was impregnated with the solution of the matrix materials. The prepregs were dried to constant weight in an oven at temperatures of 50 to 70° C., with application of reduced pressure.

After the removal of solvent, all prepregs led to a continuous surface without blister formation.

The prepregs had good further processability.

DSC Measurements

The DSC analyses (glass transition temperature determinations) are conducted with a Mettler Toledo DSC 821e according to

DIN 53765.

The DSC analyses of the prepregs from Examples 1-4 give the following results:

TABLE 2

| DSC analyses | | | | |
|---|---|---|---|---|
|  | Ex. 1 | Ex. 2 | Ex. 3 | Ex. 4 |
| Tg (2nd heating) in ° C. | 97 | 116 | 121 | 124 |

The glass transition temperatures which are measured in the second heating run are the glass transition temperatures of the fully reacted/crosslinked matrix material.

Composite Component Production

The composite components were produced by means of a pressing technique known to those skilled in the art on a composite press. The homogeneous prepregs produced by means of direct impregnation were compressed to give composite materials on a benchtop press. This benchtop press is the Polystat 200 T from Schwabenthan, with which the prepregs were pressed at temperatures between 120 and 200° C. to give the corresponding composite sheets. The pressure was varied between standard pressure and 450 bar.

In Examples 1 and 2, the press temperature was set to 150° C. and increased to 180° C. over the course of pressing; the pressure was increased to 5 bar after a short melting phase of 3 minutes and maintained until the removal of the composite component from the press after up to 30 minutes. The hard, stiff, chemical-resistant and impact-resistant composite components (sheet material) were analysed with regard to the degree of curing (determination via DSC). In the case of the polyurethane composition used, crosslinking is complete after about 20 minutes, in which case no enthalpy of reaction is detectable any longer for the crosslinking reaction.

In Examples 3 and 4 (catalysed variant), the press temperature was set to 150° C. and increased to 180° C. over the course of pressing; the pressure was increased to 5 bar after a short melting phase of 3 minutes and maintained until the removal of the composite component from the press after up to 10 minutes. The hard, stiff, chemical-resistant and impact-resistant composite components (sheet material) were analysed with regard to the degree of curing (determination via DSC). In the case of the polyurethane composition used, crosslinking is complete after about 20 minutes, in which case no enthalpy of reaction is detectable any longer for the crosslinking reaction.

The inventive compositions have a relatively low melt viscosity and are additionally at least of equally good suitability for the production of composites compared to the conventional formulations. The Tgs and hence the heat resistance are at least equally good, and tend to be somewhat higher. Because of the production of compositions in one stage, there are no additional mixing steps, and the susceptibility to error for an incorrect stoichiometry is reduced.

The invention claimed is:
1. A prepreg comprising
   A) a fibrous carrier, and
   B) a storage stable one component polyurethane composition having a Tg of equal to or less than 38° C., as determined by in accordance with DIN EN ISO 11357-1 and the polyurethane composition comprises an internally blocked and/or blocking agent blocked di- and/or polyisocyanates and/or polyaddition compounds thereof.
2. The prepreg according to claim 1, wherein the fibrous carrier is selected from the group consisting of glass, carbon, plastics, natural fibers, or mineral fiber materials.

3. The prepreg according to claim 1, wherein the fibrous carrier present are textile structures made from nonwoven fabric, knitted fabric including loop-formed and loop-drawn knits, or non-knitted fabrics.

4. The prepreg according to claim 1, wherein the di- and/or polyisocyanates are selected from the group consisting of isophorone diisocyanate (IPDI), hexamethylene diisocyanate (HDI), 4,4'-diisocyanatodicyclohexylmethane, 2,4'-diisocyanatodicyclohexylmethane, 2,2'-diisocyanatodicyclohexylmethane, alone or in mixtures of the isomers ($H_{12}$MDI), 2-methylpentane diisocyanate (MPDI), 2,2,4-trimethylhexamethylene diisocyanate, 2,4,4-trimethylhexamethylene diisocyanate and mixtures thereof (TMDI), and norbornane diisocyanate (NBDI).

5. The prepreg according to claim 1, wherein external blocking agents are selected from the group consisting of ethyl acetoacetate, diisopropylamine, methyl ethyl ketoxime, diethyl malonate, ε-caprolactam, 1,2,4-triazole, phenol or substituted phenols and 3,5-dimethylpyrazole.

6. The prepreg according to claim 1, wherein the polyurethane composition B) comprises catalysts selected from the group consisting of dibutyltin dilaurate, zinc octoate, bismuth neodecanoate, tertiary amines, and 1,4-diazabicyclo[2.2.2]octane, in amounts of 0.001%-1% by weight.

7. The prepreg according to claim 1, comprising a polyurethane composition B) containing uretdione groups and having a Tg of equal to or less than 38° C., comprising
   a) at least one polyaddition compound containing uretdione groups, based on the polyaddition reaction of polyisocyanates containing aliphatic, (cyclo)aliphatic or cycloaliphatic uretdione groups and hydroxyl-containing compounds, where the polyaddition compound has a free NCO content of less than 5% by weight and a uretdione content of 3%-25% by weight, and
   c) a catalyst.

8. The prepreg according to claim 7, wherein the di- and/or polyisocyanates selected from isophorone diisocyanate (IPDI), hexamethylene diisocyanate (HDI), 4,4'-diisocyanatodicyclohexylmethane, 2,4'-diisocyanatodicyclohexylmethane, 2,2'-diisocyanatodicyclohexylmethane, alone or in mixtures of the isomers ($H_{12}$MDI), 2-methylpentane diisocyanate (MPDI), 2,2,4-trimethylhexamethylene diisocyanate, 2,4,4-trimethylhexamethylene diisocyanate and mixtures thereof (TMDI), norbornane diisocyanate (NBDI).

9. The prepreg according to claim 8, wherein di- and/or polyisocyanates selected from the group consisting of IPDI, HDI, TMDI and $H_{12}$MDI for preparation of the uretdiones.

10. The prepreg according to claim 7, comprising
   B) at least one polyurethane composition containing uretdione groups and having Tg of equal to or less than 38° C., comprising
     a) at least one polyaddition compound containing uretdione groups and
     b) optionally at least one PUR catalyst,
     c) optionally auxiliaries and additives known from polyurethane chemistry,
     d) from 0.1% to 5% by weight of at least one catalyst selected from quaternary ammonium salts and/or quaternary phosphonium salts with halogens, hydroxides, alkoxides or organic or inorganic acid anions as counterion,
     and
     e) from 0.1% to 5% by weight of a cocatalyst selected from
       e1) at least one epoxide
       and/or
       e2) at least one metal acetylacetonate and/or quaternary ammonium acetylacetonate and/or quaternary phosphonium acetylacetonate.

11. The prepreg according to claim 7, further comprising
   c) optionally auxiliaries and additives known from polyurethane chemistry,
   d) from 0.1% to 5% by weight of at least one catalyst selected from quaternary ammonium salts and/or quaternary phosphonium salts with halogens, hydroxides, alkoxides or organic or inorganic acid anions as counterion,
   and
   e) from 0.1% to 5% by weight of at least one cocatalyst selected from
     e1) at least one epoxide
     and/or
     e2) at least one metal acetylacetonate and/or quaternary ammonium acetylacetonate and/or quaternary phosphonium acetylacetonate.

12. The prepreg according to claim 7, wherein the catalyst is selected from the group consisting of tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate, and tetrabutylphosphonium acetate, tetrabutylphosphonium formate and ethyltriphenylphosphonium acetate, tetrabutylphosphonium benzotriazolate, tetraphenylphosphonium phenolate and trihexyltetradecylphosphonium decanoate, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, methyltributylammonium methoxide, methyltriethylammonium methoxide, tetramethylammonium methoxide, tetraethylammonium methoxide, tetrapropylammonium methoxide, tetrabutylammonium methoxide, tetrapentylammonium methoxide, tetrahexylammonium methoxide, tetraoctylammonium methoxide, tetradecylammonium methoxide, tetradecyltrihexylammonium methoxide, tetraoctadecylammonium methoxide, benzyltrimethylammonium methoxide, benzyltriethylammonium methoxide, trimethylphenylammonium methoxide, triethylmethylammonium methoxide, trimethylvinylammonium methoxide, methyltributylammonium ethoxide, methyltriethylammonium ethoxide, tetramethylammonium ethoxide, tetraethylammonium ethoxide, tetrapropylammonium ethoxide, tetrabutylammonium ethoxide, tetrapentylammonium ethoxide, tetrahexylammonium ethoxide, tetraoctylammonium methoxide, tetradecylammonium ethoxide, tetradecyltrihexylammonium ethoxide, tetraoctadecylammonium ethoxide, benzyltrimethylammonium ethoxide, benzyltriethylammonium ethoxide, trimethylphenylammonium ethoxide, triethylmethylammonium ethoxide, trimethylvinylammonium ethoxide, methyltributylammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctylammonium benzylate, tetradecylammonium benzylate, tetradecyltrihexylammonium benzylate, tetraoctadecylammonium benzylate, benzyltrimethylammonium benzylate, benzyltriethylammonium benzylate, trimethylphenylammonium benzylate, triethylmethylammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride.

13. The prepreg according to claim 10, wherein cocatalysts e1) present are glycidyl ethers, glycidyl esters, aliphatic epoxides, diglycidyl ethers based on bisphenol A and glycidyl methacrylates, alone or in any desired mixtures.

14. The prepreg according to claim 10, wherein the cocatalyst is selected from the group consisting of zinc acetylacetonate, lithium acetylacetonate and tin acetylacetonate.

15. The prepreg according to claim 10, wherein the cocatalyst is selected from the group consisting of tetramethylammonium acetylacetonate, tetraethylammonium acetylacetonate, tetrapropylammonium acetylacetonate, tetrabutylammonium acetylacetonate, benzyltrimethylammonium acetylacetonate, benzyltriethylammonium acetylacetonate, tetramethylphosphonium acetylacetonate, tetraethylphosphonium acetylacetonate, tetrapropylphosphonium acetylacetonate, tetrabutylphosphonium acetylacetonate, benzyltrimethylphosphonium acetylacetonate, benzyltriethylphosphonium acetylacetonate, alone or in any desired mixtures.

16. A process for producing a prepreg according to claim 1, comprising the step of mixing
   A) at least one fibrous carrier
   and
   B) at least one polyurethane composition with Tg<40° C.,
      I. by preparing the polyurethane composition B),
      And
      II. impregnating the fibrous carrier A) with the polyurethane composition B) which has optionally been dissolved in solvent,
      III. and optionally removing the solvent.

17. A direct melt impregnation process for producing a prepreg according to claim 1, comprising the step of mixing
   A) at least one fibrous carrier
   and
   B) at least one polyurethane composition with Tg<40° C. as matrix material,
      I. by preparing the polyurethane composition B) in the melt,
      and
      II. directly impregnating the fibrous carrier A) with the melt from B).

18. A fiber comprising the pregreg of claim 1.

19. A composite component comprising a pregreg according to claim 1.

20. The prepreg according to claim 1, wherein the additional catalyst is from 0.001%-1% by weight of the prepreg of 1,4-diazabicyclo[2.2.2]octane.

* * * * *